United States Patent
Hunt

(10) Patent No.: US 12,185,653 B2
(45) Date of Patent: Jan. 7, 2025

(54) MOUNTING APPARATUS FOR AGRICULTURAL HEADER SENSORS

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 946 days.

(21) Appl. No.: 17/224,585

(22) Filed: Apr. 7, 2021

(65) Prior Publication Data

US 2022/0322598 A1    Oct. 13, 2022

(51) Int. Cl.
*A01B 76/00*    (2006.01)
*G01S 13/88*    (2006.01)

(52) U.S. Cl.
CPC .............. *A01B 76/00* (2013.01); *G01S 13/88* (2013.01)

(58) Field of Classification Search
CPC ......... A01B 76/00; G01S 13/88; G01D 11/30; A01D 41/14
See application file for complete search history.

(56) References Cited

U.S. PATENT DOCUMENTS

| | | | | |
|---|---|---|---|---|
| 3,886,718 A | * | 6/1975 | Talbot | A01D 41/141 56/208 |
| 3,991,618 A | * | 11/1976 | Stampfer | B62D 1/28 33/DIG. 13 |
| 4,507,910 A | * | 4/1985 | Thornley | A01D 57/00 56/DIG. 15 |
| 4,811,751 A | | 3/1989 | Maloney, II | |
| 5,884,224 A | * | 3/1999 | McNabb | A01G 7/00 700/284 |
| 6,791,488 B2 | | 9/2004 | Diekhans et al. | |
| 6,826,894 B2 | | 12/2004 | Thiemann et al. | |
| 9,585,309 B2 | | 3/2017 | Posselius et al. | |
| 9,807,933 B2 | | 11/2017 | Boyd et al. | |
| 10,117,374 B2 | | 11/2018 | Boydens et al. | |

(Continued)

FOREIGN PATENT DOCUMENTS

| | | | | |
|---|---|---|---|---|
| CA | 2997798 A1 | * | 9/2018 | ............. A01D 34/04 |
| CN | 106961925 A | | 7/2017 | |

(Continued)

OTHER PUBLICATIONS

Extended European Search Report for EP Application No. 22166441.0 dated Aug. 17, 2022 (six pages).

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A sensor mounting apparatus for a header of an agricultural system includes a first arched member configured to be coupled to opposite lateral ends of the header, such that the first arched member extends laterally across the header. The sensor mounting apparatus also includes a second arched member configured to be coupled to opposite lateral ends of the header, such that the second arched member extends laterally across the header. The first arched member and the second arched member are configured to couple to one another at respective central portions of the first and second arched members. The first and second arched members are configured to support one or more sensors.

18 Claims, 7 Drawing Sheets

(56) References Cited

U.S. PATENT DOCUMENTS

| | | | |
|---|---|---|---|
| 11,483,972 B2 * | 11/2022 | Dima | A01B 63/008 |
| 11,533,847 B2 * | 12/2022 | Hunt | A01D 41/141 |
| 11,533,851 B2 * | 12/2022 | Hunt | A01D 75/00 |
| 2005/0028504 A1 * | 2/2005 | Gramm | A01D 41/06 |
| | | | 56/208 |
| 2008/0264025 A1 * | 10/2008 | Ditchcreek | A01D 75/18 |
| | | | 248/251 |
| 2016/0106038 A1 | 4/2016 | Boyd et al. | |
| 2021/0185916 A1 * | 6/2021 | Hunt | A01D 75/18 |

FOREIGN PATENT DOCUMENTS

| | | | | |
|---|---|---|---|---|
| CN | 111903317 A | * | 11/2020 | A01D 41/06 |
| EP | 0198544 A1 | * | 10/1986 | A01D 41/145 |
| EP | 0266259 A1 | * | 5/1988 | A01D 46/28 |
| EP | 2316259 A1 | | 5/2011 | |
| FR | 2639177 A1 | * | 5/1990 | A01D 46/28 |
| GB | 2173309 A | | 10/1986 | |
| WO | 2019140512 A1 | | 7/2019 | |
| WO | WO-2021062552 A1 | * | 4/2021 | A01D 34/04 |

\* cited by examiner

MOUNTING APPARATUS FOR AGRICULTURAL HEADER SENSORS

BACKGROUND

The present disclosure generally relates to an apparatus for mounting sensors to an agricultural header.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, canola, or other plant crops. The harvester may include a header. The header may have a set of sensor(s) for sensing harvester location, crop properties, or the like. The sensors may be attached to the harvester frame, the header, one or more structures attached thereto, or a combination thereof. Certain headers do not include a stationary structure (e.g., structure that does not move relative to a frame of the header) in the middle of the header. Accordingly, mounting locations for the sensors may be limited.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a sensor mounting apparatus for a header of an agricultural system includes a first arched member configured to be coupled to opposite lateral ends of the header, such that the first arched member extends laterally across the header. The sensor mounting apparatus also includes a second arched member configured to be coupled to opposite lateral ends of the header, such that the second arched member extends laterally across the header. The first arched member and the second arched member are configured to couple to one another at respective central portions of the first and second arched members. The first and second arched members are configured to support one or more sensors.

DRAWINGS

These and other features, aspects, and advantages of the present disclosure will become better understood when the following detailed description is read with reference to the accompanying drawings in which like characters represent like parts throughout the drawings, wherein.

Figure 2:
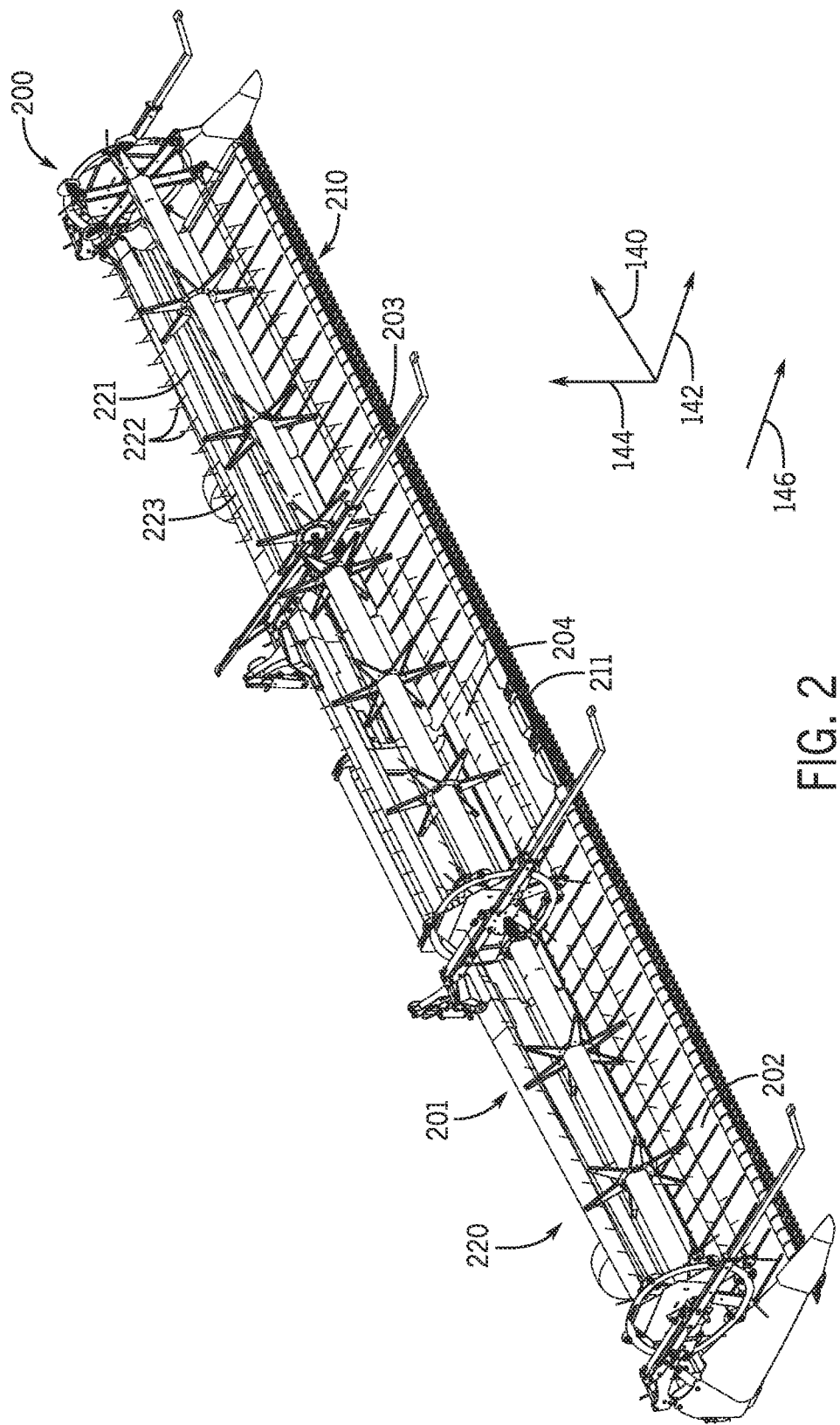
FIG. 2 is a perspective view of an embodiment of a header that may be employed within the agricultural system of FIG. 1, in accordance with an aspect of the present disclosure.
Figure 7:
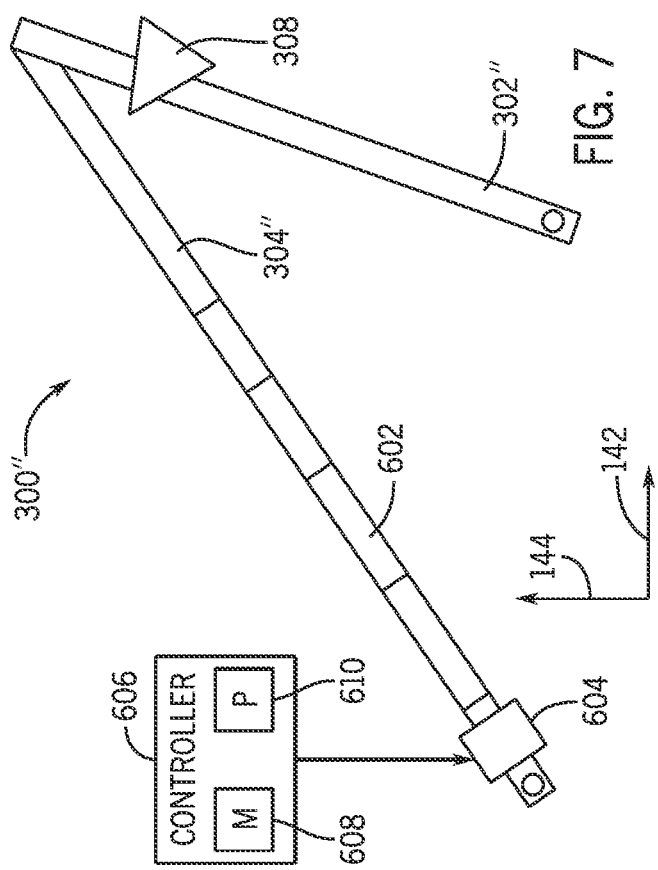
Figure 6:
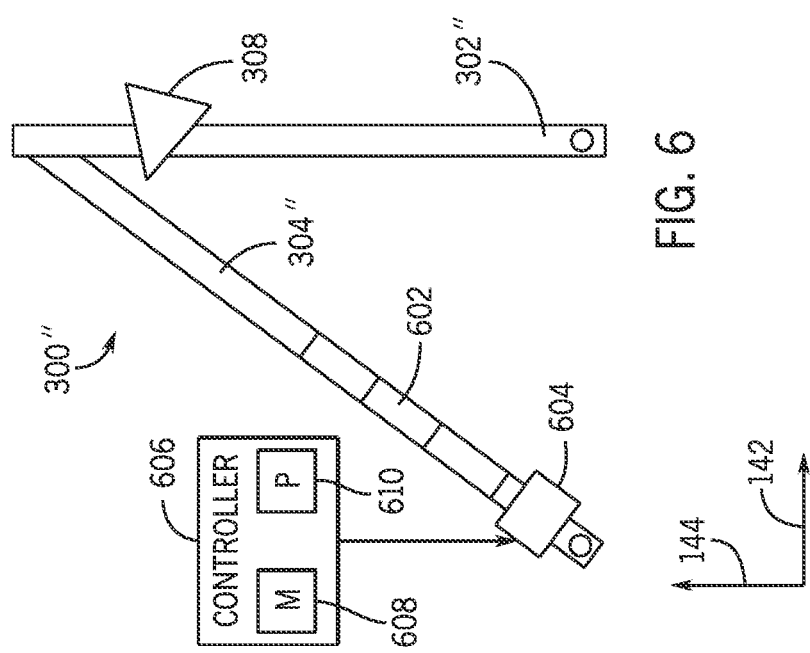
FIG. 6 is a side view of an embodiment of a sensor mounting apparatus that may be employed within the header of FIG. 2, in which a telescoping portion of the sensor mounting apparatus is retracted, in accordance with an aspect of the present disclosure.
Figure 8:
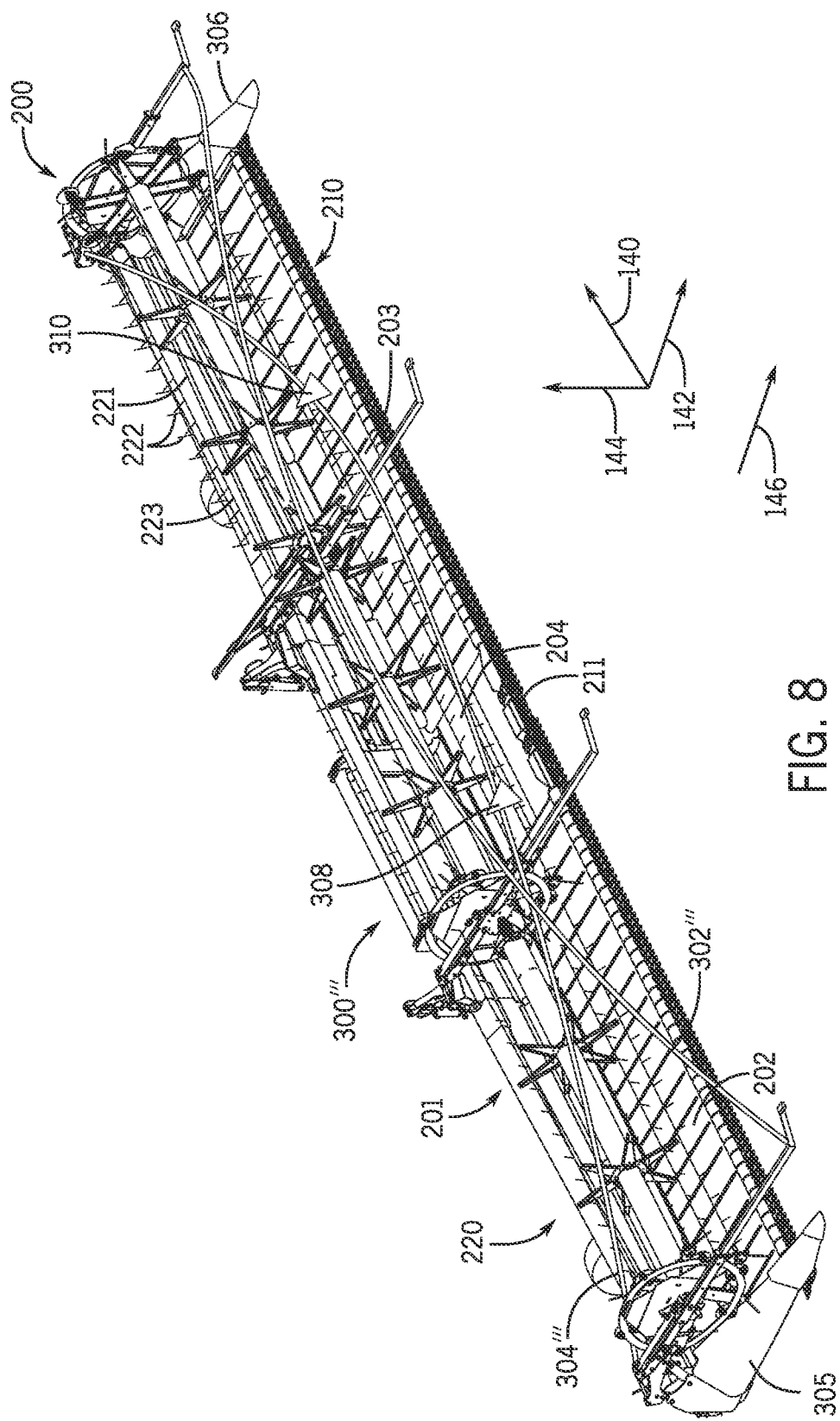

FIG. 7 is a side view of the sensor mounting apparatus of FIG. 6, in which the telescoping portion of the sensor mounting apparatus is extended, in accordance with an aspect of the present disclosure; and FIG. 8 is a perspective view of an embodiment of a sensor mounting apparatus that may be employed within the header of FIG. 2, in which the arched members are connected at two locations, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header. The harvester may be at least partially automated so as to harvest crops at least partially independent of human control. The harvester and the header may be outfitted with a variety of sensors for gathering data pertaining to harvester position, header position, crop properties, or the like. The sensors may be affixed to the header through a variety of mounts and/or supports. Often the structures used to affix sensors to a header are sufficiently rigid to substantially block movement of the sensors relative to a frame of the header. Additionally, the structures often weigh significantly more than the sensors themselves, and may be adjusted with the use of tools.

The present disclosure is directed to a sensor mounting apparatus including a pair of arched members connected at their respective center points. One or more sensors may be attached to the arched members along the length of the arched members. Additionally, the arched members may have telescoping portions configured to be manipulated by actuators to adjust the position of the sensors relative to the header. The apparatus may allow the sensors to affix to the header using a structure that is rigid, light, and capable of tool-less adjustment.

Figure 1:
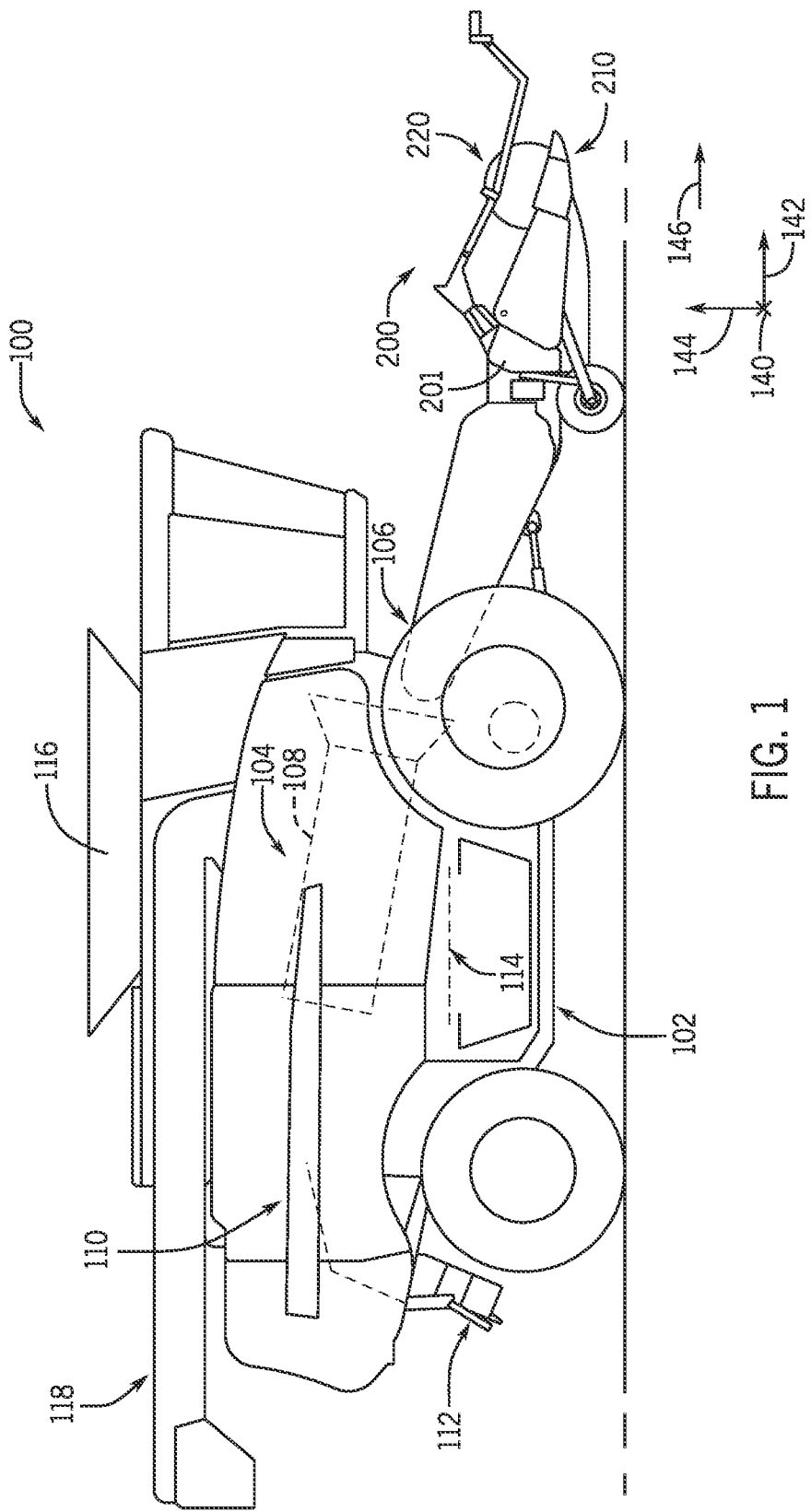
FIG. 1 is a side view of an embodiment of an agricultural system, in accordance with an aspect of the present disclosure.

With the foregoing in mind, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material upward via an elevator to a storage tank 116 within the agricultural system 100. When the storage tank 116 is full, a tractor towing a trailer may pull alongside the agricultural system 100. The desired crop material collected in the storage tank 116 may be carried and expelled from an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or components of the agricultural system may be described with reference to a lateral axis or direction 140, a longitudinal axis or direction 142, and a vertical axis or direction 144. The agricultural system 100 and/or components of the agricultural system may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto a conveyor system that directs the cut crops toward the inlet 106 of the agricultural crop processing system 104. The reel assembly 220 includes a reel having multiple fingers extending from a central framework. The central framework is driven to rotate such that the fingers engage the crops and urge the crops toward the cutter bar assembly 210 and the conveyor system. Additionally, the reel may be supported by multiple arms (e.g., reel arms) that are coupled to a frame 201 of the header 200. Each of the arms may be coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

FIG. 2 is a perspective view of an embodiment of a header 200 that may be employed within the agricultural system 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center of the header 200. However, in other embodiments, the blade support/moving blade assembly may be driven by another suitable mechanism (e.g., located at any suitable position on the header 200). As the agricultural system 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200 opposite the first lateral side. The conveyor sections 202, 203 may be separate from one another. For instance, the first conveyor section 202 may extend along a portion of a width of the header 200 and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops through the inlet to the agricultural crop processing system for further processing of the cut crops. Although the illustrated header 200 includes two conveyor sections 202, 203 configured to direct crops toward the center conveyor section 204, there may be any suitable number of conveyor sections in additional or alternative embodiments directing the crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers or tines 222 extending from a central framework 223. The central framework 223 is driven to rotate such that the fingers 222 move (e.g., in a circular pattern). The fingers 222 are configured to engage the crops and to urge the cut crops toward the conveyor sections 202, 203 to facilitate transportation of the cut crops to the agricultural crop processing system.

As illustrated herein, the cutter bar assembly 210 is flexible along the width of the header 200. The cutter bar assembly 210 is supported by multiple arm assemblies distributed along the width of the header 200. In some embodiments, the frame 201 of the header 200 may be movably coupled to the chassis of the agricultural system. Each arm assembly is mounted to the frame 201 and includes an arm coupled to the cutter bar assembly 210. The arm may rotate and/or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200. Moreover, certain parts of the header 200 may move (e.g., rotate) relative to one another. For example, the header 200 includes a first section (e.g., center section) 224, a second section 225 extending from a side of the first section 224, and a third section 226 extending from another side of the first section 224. The sections 224, 225, 226 may be movable (e.g., rotatable) relative to one another, such as to raise and/or lower the second section 225 and/or the third section 226 relative to the first section 224 in order to enable the cutter bar assembly 210 to follow the contour of the field more accurately. In certain embodiments, the header 200 may include one section.

Figure 3:
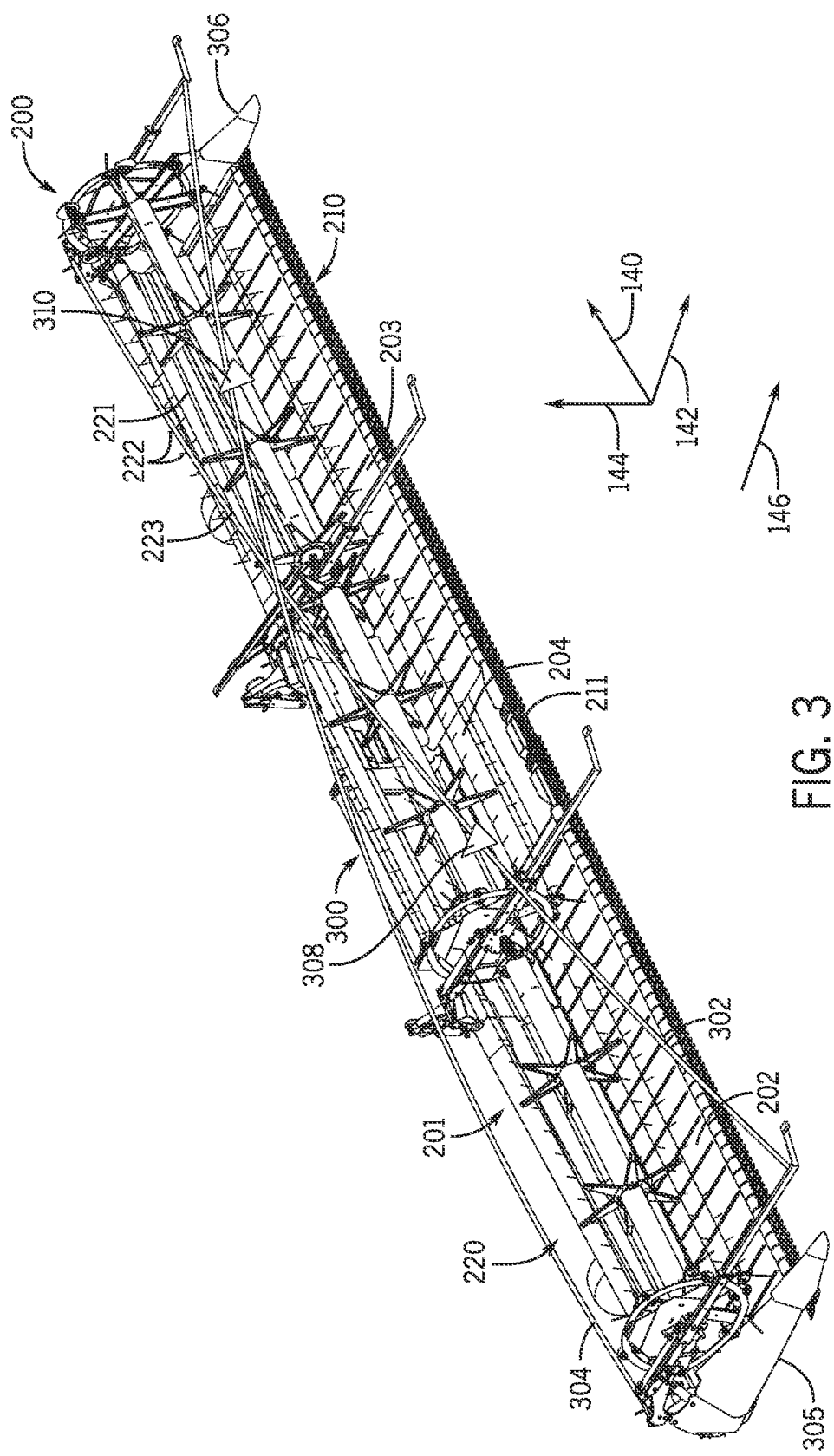
FIG. 3 is a perspective view of an embodiment of a sensor mounting apparatus that may be employed within the header of FIG. 2, in accordance with an aspect of the present disclosure.

FIG. 3 is a perspective view of an embodiment of a sensor mounting apparatus 300 that may be employed within the header 200 of FIG. 2. The sensor mounting apparatus 300 includes a first arched member 302 and a second arched member 304. The first arched member 302 and the second arched member 304 are extended members (i.e., members whose length is significantly greater than their width) affixed to the header 200 and extend laterally across the header 200 in an arched configuration. Each arched member may have any suitable cross-sectional shape (e.g., circular, polygonal, etc.) and may be solid or hollow. In certain embodiments, the first arched member 302 and/or the second arched member 304 may be manufactured to hold a permanent arched geometry. In such embodiments, the curvature of at least one permanently arched member may be substantially equal to the illustrated mounted curvature, the curvature of at least one permanently arched member may be greater than the illustrated mounted curvature (e.g., such that the permanently arched member is stretched laterally outward for mounting), the curvature of at least one permanently arched member may be less than the illustrated mounted curvature (e.g., such that the permanently arched member is compressed laterally inward for mounting), or a combination thereof. Furthermore, in certain embodiments, the first arched member 302 and/or the second arched member 304 may be formed in a straight geometry and deformed (e.g., compressed laterally inward) to establish the illustrated mounted curvature. The deformation may be plastic deformation (i.e., the arched members maintain their deformed shape when uninstalled) or elastic deformation (i.e., the arched members revert to their original undeformed shape when uninstalled). Whether the deformation is plastic deformation or elastic deformation may depend on the material of the arched members in addition to the degree to which the materials are strained. Additionally, the first arched member 302 and the second arched member 304 may be formed from any suitable material(s). For example, in certain embodiments, the first arched member 302 and/or the second arched member 304 may be formed from metal (e.g., steel, aluminum, titanium, etc.). Furthermore, in certain embodiments, the first arched member 302 and/or the second arched member 304 may be formed from a composite material (e.g., including fiber glass, graphite, carbon fiber, etc.). For example, at least one of the first and second arched members may be formed from a carbon fiber reinforced composite (CFRP). In certain embodiments, the first arched member 302 and the second arched member 304 may have substantially identical dimensions (e.g., length, thickness, etc.). However, in other embodiments, the dimensions of the arched members may vary to facilitate attachment to the header 200.

The first arched member 302 and the second arched member 304 may affix (e.g., couple) to the header 200 at each end of the respective member. The ends of each arched member may attach to opposing lateral sides of the header. In certain embodiments, each arched member may attach to a first lateral end 305 and a second lateral end 306. The first lateral end 305 may be a portion (e.g., 5%, 10%, 15%, etc.) of the header's total lateral length on an extreme end along the lateral direction 140. The second lateral end 306 may be a portion (e.g., 5%, 10%, 15%, etc.) of the header's total lateral length on an extreme end opposite of the first lateral end 305. In the illustrated embodiment, each arched member is attached to a pair of reel arms positioned on opposite lateral sides of the header. However, in other embodiments, at least one arched member may be attach to the frame 201 of the header, to other reel arm(s), to vertical knives apparatus, to another suitable portion of the header by way of a connection, or a combination thereof. In certain embodiments, the arched members may affix to a multi section header. The arched members may affix to the two ends of the sections farthest from the center of the header. The arched members may elastically deform when the position of angle of each header is adjusted. In certain other embodiments, a plurality of sensor mounting apparatus may individually affix to the sections of a header with multiple sections. In certain other embodiments, at least one connection between an arched member and the header may include a structure that enables rotation and/or translation of the arched member end relative to the header, such as a Heim joint, a bearing coupler, other suitable type(s) of connection structure(s), or a combination thereof. Furthermore in certain embodiments, at least one connection may be a weld, a set of bolts configured to affix each arched member securely to the header, or another type of connection that disallows motion at the connection. The first arched member 302 and the second arched member 304 may be centrally connected to one another at respective central portions by a joint. Each central portion may be a middle length (e.g. 1%, 5%, 10%, 50%, etc.) of each arched member extending from a central point equidistant from each end.

The sensor mounting apparatus 300 may include one or more sensors affixed (e.g., coupled) to the first arched member 302 and/or the second arched member 304. In the illustrated embodiment, a first sensor 308 is coupled to the first arched member 302, and a second sensor 310 is coupled to the second arched member 304. Each sensor may include light detection and ranging (LIDAR) sensor(s), radio detection and ranging (radar) sensor(s), optical sensor(s) (e.g., camera(s), etc.) other suitable type(s) of sensor(s), or a combination thereof. The first sensor 308 and the second sensor 310 may be oriented to point generally toward the ground ahead of the header 200. For example, the first sensor 308 and the second sensor 310 may be oriented to point 45 degrees below the longitudinal direction 142 within a horizontal plane created by the longitudinal axis 142 and the vertical axis 144. In some embodiments, the first sensor 308 and the second sensor 310 may be oriented to point in different directions. Furthermore, in certain embodiments, at least one sensor may be affixed (e.g., coupled) to the joint connecting the first and second arched members. The placement of the sensors may vary depending on the agricultural application and the configuration of the arched members. In certain embodiments, there may be more than two sensors included in the sensor mounting apparatus 300. In other embodiments, there could be fewer than two sensors.

Figure 4:
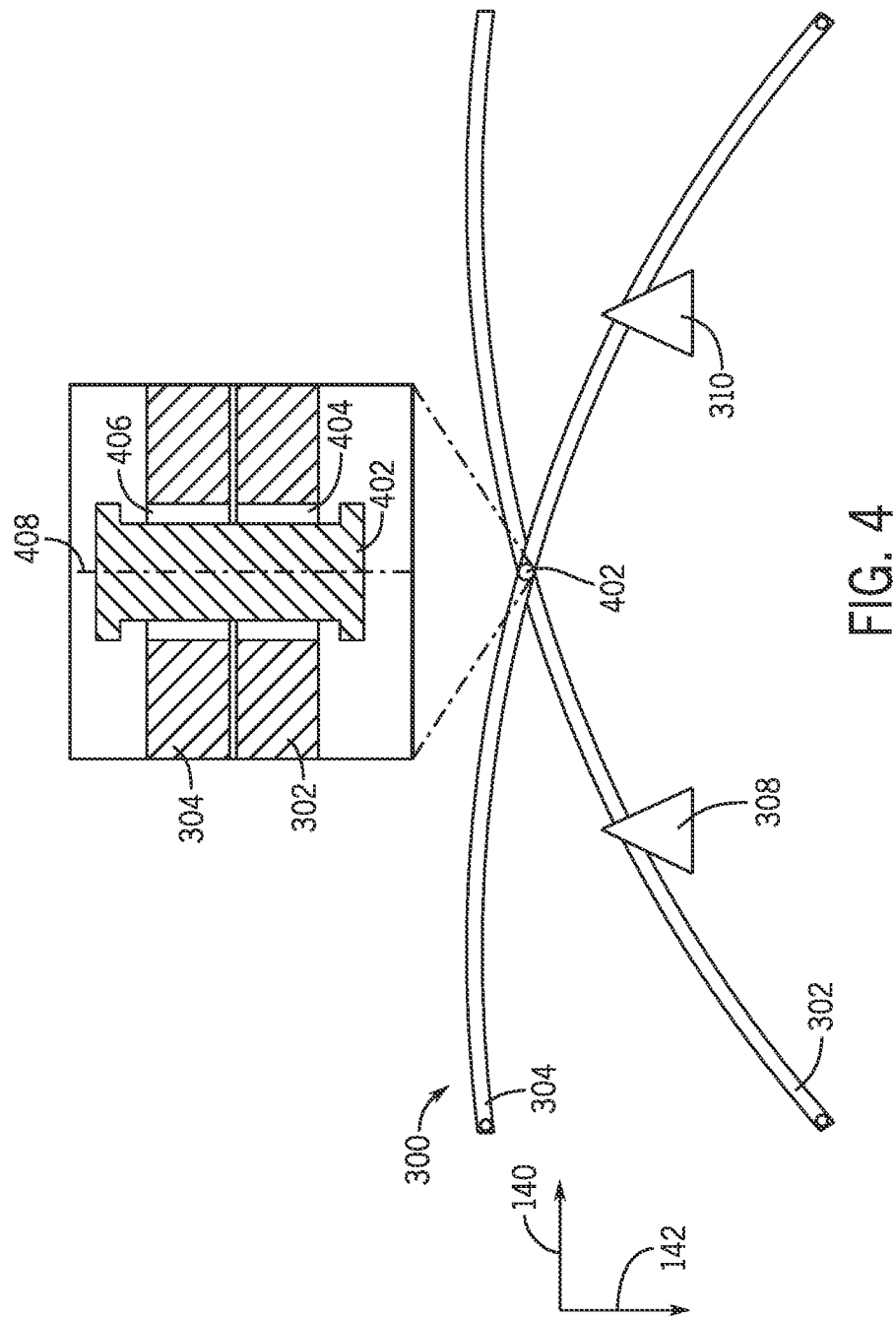
FIG. 4 is a top view of the sensor mounting apparatus of FIG. 3, in which a pair of arched members are connected by a pin joint, in accordance with an aspect of the present disclosure.

FIG. 4 is a top view of the sensor mounting apparatus 300 of FIG. 3, in which the first arched member 302 and the second arched member 304 are pivotally connected by a pin joint 402. In the illustrated embodiment, the arched members are attached to the header so as to cross one another (e.g., at the lateral center of each arched member). For example, a first end of the first arched member 302 may attach to a front (e.g., with reference to the longitudinal direction 142) portion of a reel arm on one lateral side of the header, and a second end of the first arched member 302 may attach to a rear portion of a reel arm on the opposite lateral side of the header. A first end of the second arched member 304 may attach to a rear (e.g., with reference to the longitudinal direction 142) portion of a reel arm on one lateral side of the header, and a second end of the second arched member 302 may attach to a front portion of a reel arm on the opposite lateral side of the header. In this configuration, the arched members may cross one another. Furthermore, FIG. 4 includes a cross-sectional view of the pin joint 402. The pin joint 402 may connect the first arched member 302 and the second arched member 304, which in the illustrated installed configuration, crosses over the first arched member 302. In certain other embodiments, the first arched member 302 may cross over the second arched member 304. Additionally, the pin joint 402 may be cylindrically formed of metal or another suitable material. The pin joint 402 may extend through a first opening 404 in the first arched member 302 and through a second opening 406 in the second arched member 304. Additionally, the pin joint 402 may be housed by any suitable structure (e.g., a bearing, a bushing, etc.). In certain embodiments, the opening in at least one of the arched members may extend along the length of the arched member in order to facilitate movement of the arched members relative to the pin joint 402. In another example, the arched members may be fixedly coupled to one another (e.g., welded, fixed with fasteners, held in place by a pin, etc.). Additionally, the pin joint 402 includes a radial extension at each end to block separation of the arched members. The pin joint 402 may be cylindrical to enable the first arched member 302 and the second arched member 304 to rotate about a pin axis 408. In the illustrated embodiment, the first sensor 308 is pivotally affixed (e.g., coupled) to the first arched member 302, and the second sensor 310 is pivotally affixed (e.g., coupled) to the second arched member 304. In some embodiments, both sensors may be attached to the same arched member.

Figure 5:
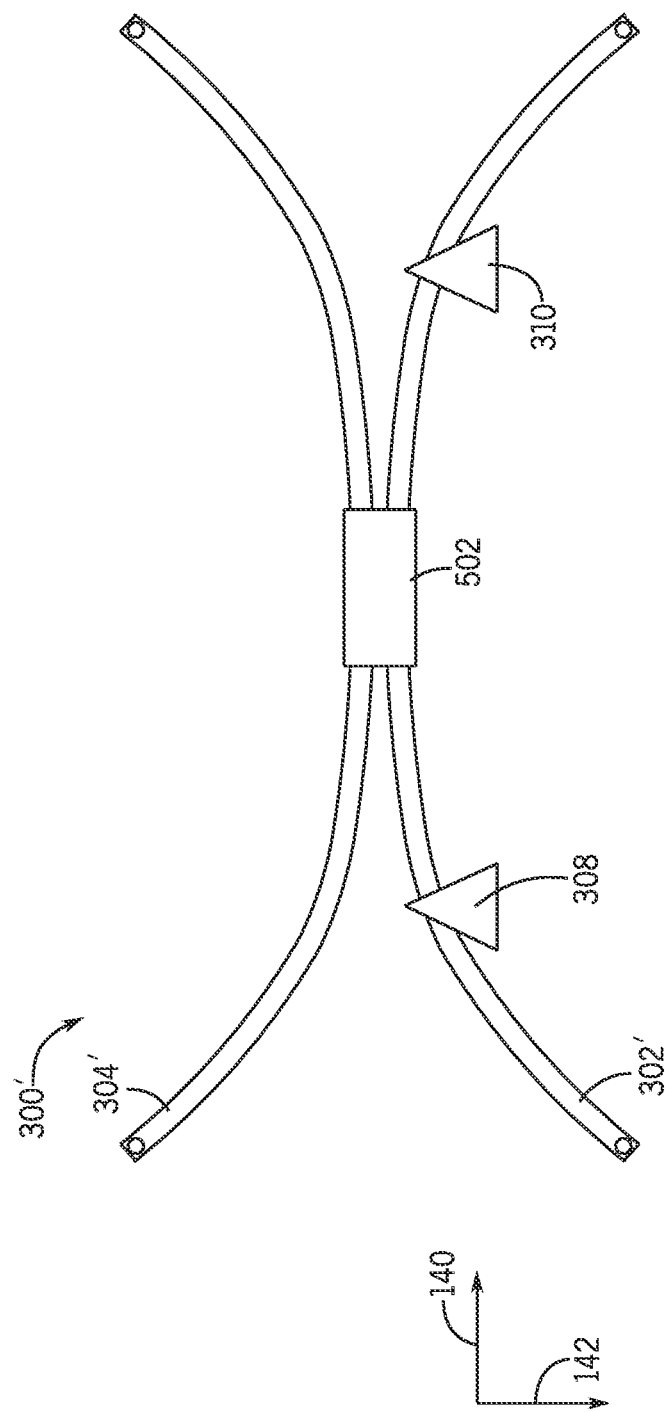
FIG. 5 is a top view of an embodiment of a sensor mounting apparatus that may be employed within the header of FIG. 2, in which a pair of arched members are connected by a sleeve joint, in accordance with an aspect of the present disclosure.

FIG. 5 is a top view of an embodiment of a sensor mounting apparatus 300' that may be employed within the header of FIG. 2, in which the pair of arched members are connected by a sleeve joint 502. In the illustrated embodiment, the arched members are not crossed and do not overlap. For example, a first end of the first arched member 302' may attach to a front (i.e., with reference to the longitudinal direction 142) portion of a reel arm on one lateral side of the header, and a second end of the first arched member 302' may attach to a front portion of a reel arm on the opposite lateral side of the header. A first end of the second arched member 304' may attach to a rear (i.e., with reference to the longitudinal direction 142) portion of a reel arm on one lateral side of the header, and a second end of the second arched member 304' may attach to a rear portion of a reel arm on the opposite lateral side of the header. Accordingly, central portions of the arched members are positioned proximate to one another or in contact with one another (e.g., without overlapping). In certain embodiments, however, the arched portions may overlap. The sleeve joint 502 may be formed of a metal, a composite, other suitable material(s), or a combination thereof. The sleeve joint may wrap around the central portion of the first arched member 302' and the central portion of the second arched member 304' to block separation of the central portions of the arched members. In certain embodiments, the arched members may be coupled to one another using another suitable joint. For example, the arched members may be coupled with a sliding joint (e.g., a pin and slot joint, etc.). In another example, the arched members may be fixedly coupled to one another (e.g., welded, fixed with fasteners, held in place by a pin, etc.). In the illustrated embodiment, the first sensor 308 and the second sensor 310 are affixed (e.g., coupled) to the first arched member 302'. In certain other embodiments, the sensors may be affixed to the second arched member 304'. In yet other embodiments, the sensors may be affixed to both arched members.

FIG. 6 is a side view of an embodiment of a sensor mounting apparatus 300" that may be employed within the header of FIG. 2, in which a telescoping portion 602 of the sensor mounting apparatus is retracted. The sensor mounting apparatus 300" may be utilized within the sensor mounting apparatus 300 of FIGS. 3 and 4, as well as within the sensor mounting apparatus 300' of FIG. 5. The telescoping portion 602 is part of the second arched member 304" and configured to increase and decrease the length of the second arched member 304". In certain embodiments, the first arched member 302" may also include a telescoping portion to increase and decrease the length of the first arched member 302" (e.g., concurrently with the telescoping portion 602 of the second arched member 304"). In one example corresponding to the embodiment of the sensor mounting apparatus 300', the second arched member 304' may extend while the first arched member 302' may retract. In another embodiment, the first arched member 302" may include a telescoping portion while the second arched member 304" may not include a telescoping portion. In certain embodiments, the telescoping portion may be extended and retracted manually (e.g., while the agricultural system is not in use). In the illustrated embodiment, the telescoping portion 602 may be extended and retracted by an actuator 604. The actuator 604 may be a linear actuator configured to control the length of the telescoping portion 602 of the arched member. For example, the actuator 604 may include hydraulic actuator(s), pneumatic actuator(s), electric actuator(s), other suitable type(s) of actuator(s), or a combination thereof. In some embodiments, the first arched member and the second arched member may each include a respective telescoping portion (e.g., in which a respective actuator is configured to control the length of each telescoping portion). Furthermore, in certain embodiments, at least one arched member may have a telescoping portion at each end. In such embodiments, one or more actuators may be configured to extend and retract the telescoping portions of each telescoping arched member (e.g., one actuator for each telescoping portion). The actuator(s), such as the illustrated actuator 604, may be controlled by a controller 606.

In the illustrated embodiment, the sensor mounting apparatus 300″ includes a controller 606 configured to control operation of the actuator(s), such as the illustrated actuator 604. The controller 606 includes a memory 608 and a processor 610 (e.g., a microprocessor). The controller 606 may also include one or more storage devices and/or other suitable components. The processor 610 may be used to execute software, such as software for controlling operation of the actuator(s). Moreover, the processor 610 may include multiple microprocessors, one or more "general-purpose" microprocessors, one or more special-purpose microprocessors, and/or one or more application specific integrated circuits (ASICS), or some combination thereof. For example, the processor 610 may include one or more reduced instruction set (RISC) or complex instruction set (CISC) processors. The memory 608 may include a volatile memory, such as random access memory (RAM), and/or a nonvolatile memory, such as read-only memory (ROM). The memory 608 may store a variety of information and may be used for various purposes. For example, the memory 608 may store processor-executable instructions (e.g., firmware or software) for the processor 610 to execute, such as instructions for controlling operation of the actuator(s). The memory 608 and/or the processor 610, or an additional memory and/or processor, may be located in any suitable portion of the agricultural system. By way of example, the controller 606 may be located in a cab of the agricultural system and/or on the header.

FIG. 7 is a side view of the sensor mounting apparatus 300″ of FIG. 6, in which the telescoping portion 602 of the sensor mounting apparatus is extended. The controller 606 may operate the actuator 604 to extend the telescoping portion 602 to control the position and orientation of the sensors with respect to the header (e.g., the frame of the header). For example, the telescoping portion 602 may extend the second arched member 304″ such that the first sensor 308 translates forwardly along the longitudinal axis 142 and downwardly along the vertical axis 144. The first sensor 308 and second sensor 310 may also rotate clockwise within a plane created by the longitudinal axis 142 and the vertical axis 144. In certain embodiments, the controller 606 may operate the actuator 604 to retract the sensor mounting apparatus 300″ into a low-profile transport position.

FIG. 8 is a perspective view of an embodiment of the sensor mounting apparatus 300′ that may be employed within the header of FIG. 2, in which the arched members are connected at two locations, in accordance with an aspect of the present disclosure. In the illustrated embodiment, the arched members overlap at two points. For example, a first end of the first arched member 302‴ may attach to a front (i.e., with reference to the longitudinal direction 142) portion of a reel arm on one lateral side of the header, and a second end of the first arched member 302′ may attach to a front portion of a reel arm on the opposite lateral side of the header. A first end of the second arched member 304′ may attach to a rear (i.e., with reference to the longitudinal direction 142) portion of a reel arm on one lateral side of the header, and a second end of the second arched member 304′ may attach to a rear portion of a reel arm on the opposite lateral side of the header. The first arched member 302‴ and the second arched member 304‴ may be connected at two points on each member. The arched members may be connected with sliding joints (e.g., pin and slot joints, etc.), may be fixedly coupled to one another (e.g., welded, fixed with fasteners, held in place by a pin, etc.), or the like. The two points on each member at which the arched members couple to one another may be located at any point along the length of each arched member. In certain embodiments, the two points on each member at which the arched members couple to one another may be within a central portion of each arched ember. Each central portion may be a middle length (e.g. 1%, 5%, 10%, 50%, etc.) of each arched member extending from a central point equidistant from each end.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A sensor mounting apparatus for a header of an agricultural system, comprising:
    a first arched member configured to be coupled to opposite lateral ends of the header, such that the first arched member extends laterally across the header; and
    a second arched member configured to be coupled to opposite lateral ends of the header, such that the second arched member extends laterally across the header, wherein the first arched member and the second arched member are configured to couple to one another at respective central portions of the first and second arched members, wherein the first and second arched members are configured to support one or more sensors;
    wherein at least one of the first arched member or the second arched member comprises a telescoping portion.

2. The sensor mounting apparatus of claim 1, comprising a pin joint, wherein:
    the first arched member is configured to cross over the second arched member; and
    the pin joint is configured to pivotally couple the first and second arched members to one another at the respective central portions of the first and second arched members.

3. The sensor mounting apparatus of claim 2, comprising:
    the one or more sensors, wherein each sensor of the one or more sensors is mounted on the first arched member, the second arched member, or a combination thereof;
    an actuator configured to control a length of the telescoping portion; and
    a controller comprising a memory and a processor, wherein the controller is configured to control the actuator to adjust a position of the one or more sensors with respect to the header.

4. The sensor mounting apparatus of claim 1, comprising a sleeve joint, wherein the sleeve joint is configured to pivotally couple the first and second arched members to one another at the respective central portions of the first and second arched members.

5. The sensor mounting apparatus of claim 4, comprising:
a first actuator coupled to a first end of the second arched member, wherein the second arched member comprises the telescoping portion, and the first actuator is configured to control a length of the telescoping portion of the second arched member; and
a second actuator coupled to a second end of the second arched member, wherein the second arched member comprises a second telescoping portion, and the second actuator is configured to control a length of the second telescoping portion of the second arched member.

6. The sensor mounting apparatus of claim 5, comprising:
a first sensor of the one or more sensors;
a second sensor of the one or more sensors, wherein the first and second sensors are configured to be mounted on the first arched member; and
a controller comprising a memory and a processor, wherein the controller is configured to control the first actuator and the second actuator to adjust a position of the first and second sensors with respect to the header.

7. The sensor mounting apparatus of claim 5, comprising:
a first sensor of the one or more sensors; and
a second sensor of the one or more sensors, wherein the first sensor and the second sensor are coupled to the first arched member.

8. The sensor mounting apparatus of claim 1, wherein at least one of the one or more sensors comprises a radar sensor.

9. The sensor mounting apparatus of claim 1, wherein the lateral ends of the header comprise:
a first lateral end comprising a lateral length of the header making up 10% of a total lateral length of the header; and
a second lateral end comprising a lateral length of the header making up 10% of the total lateral length of the header, wherein the first lateral end and second lateral end are on opposite lateral sides of the header.

10. An agricultural system, comprising:
an agricultural header; and
a sensor mounting apparatus, comprising:
 a first arched member coupled to the agricultural header;
 a second arched member coupled to the agricultural header, wherein the second arched member crosses the first arched member; and
 a pin joint pivotally coupling the first arched member and the second arched member to one another; and
a plurality of sensors, wherein each sensor of the plurality of sensors is mounted on the sensor mounting apparatus.

11. The agricultural system of claim 10, wherein at least one of the first arched member or the second arched member comprises a telescoping portion.

12. The agricultural system of claim 11, comprising:
an actuator configured to control a length of the telescoping portion; and
a controller comprising a memory and a processor, wherein the controller is configured to control the actuator to adjust a position of the plurality of sensors with respect to the agricultural header.

13. The agricultural system of claim 10, wherein at least one of the first arched member or the second arched member is formed from a carbon fiber reinforced composite (CFRP).

14. The agricultural system of claim 10, wherein the first arched member and the second arched member are elastically deformed while coupled to the agricultural header.

15. The agricultural system of claim 10, comprising:
a first central portion of the first arched member, wherein the first central portion comprises a middle length of the first arched member equal to 5% of a total length of the first arched member; and
a second central portion of the second arched member, wherein the second central portion comprises a middle length of the second arched member equal to 5% of the total length of the second arched member.

16. An agricultural system, comprising:
an agricultural header; and
a sensor mounting apparatus, comprising:
 a first arched member coupled to the agricultural header;
 a second arched member coupled to the agricultural header; and
 a sleeve joint translatably coupling the first arched member and the second arched member to one another;
a plurality of sensors, wherein each sensor of the plurality of sensors is mounted on the sensor mounting apparatus;
a first actuator coupled to a first end of the second arched member, wherein the first actuator is configured to control a length of a first telescoping portion of the second arched member; and
a second actuator coupled to a second end of the second arched member, wherein the second actuator is configured to control a length of a second telescoping portion of the second arched member.

17. The agricultural system of claim 16, comprising a controller comprising a memory and a processor, wherein the controller is configured to control the first actuator and the second actuator so as to adjust a position of the plurality of sensors with respect to the header.

18. The agricultural system of claim 16, comprising:
a first central portion of the first arched member, wherein the first central portion comprises a middle length of the first arched member equal to 5% of a total length of the first arched member; and
a second central portion of the second arched member, wherein the second central portion comprises a middle length of the second arched member equal to 5% of the total length of the second arched member.

* * * * *